July 11, 1944.  B. PONTECORVO ET AL  2,353,619
GEOPHYSICAL PROSPECTING
Filed Sept. 18, 1941
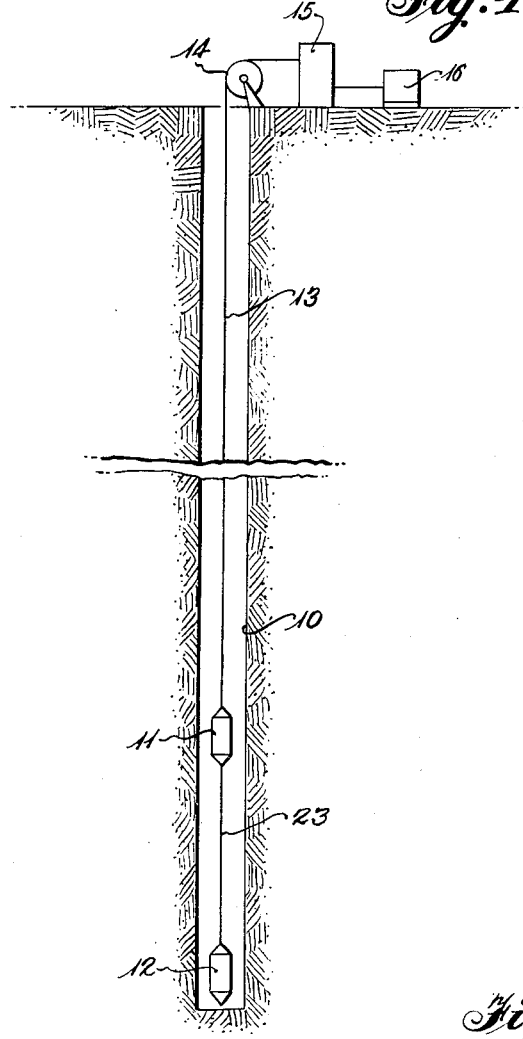
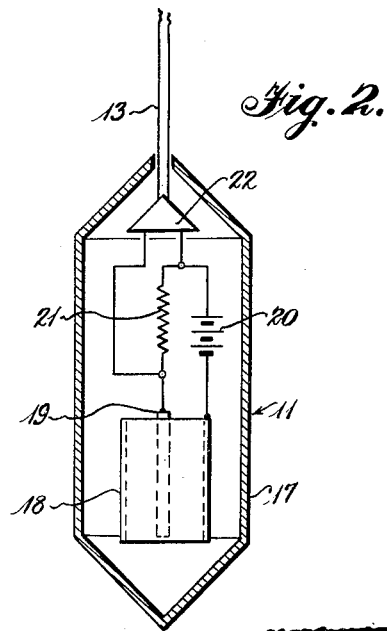
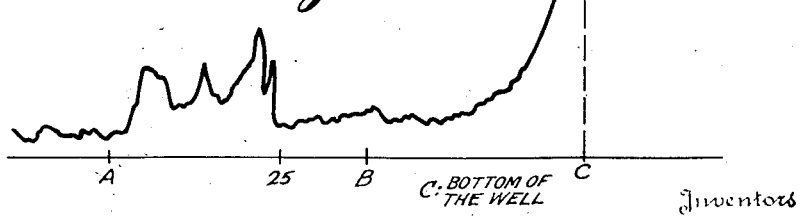
Inventors
Bruno Pontecorvo and
Gilbert Swift
By Stevens and Davis
Attorneys Patented July 11, 1944

2,353,619

UNITED STATES PATENT OFFICE 2,353,619

GEOPHYSICAL PROSPECTING

Bruno Pontecorvo and Gilbert Swift, Tulsa, Okla., assignors to Well Surveys, Incorporated, Tulsa, Okla., a corporation of Delaware Application September 18, 1941, Serial No. 411,431

12 Claims   (Cl. 250—83.6)

This invention relates generally to improvements in methods of geophysical prospecting. More particularly, it is concerned with a novel method for the accurate determination of the depth of a well bore and simultaneous prospecting of geological formations traversed by the bore by movement of prospecting equipment within the bore.

In geophysical prospecting operations, particularly in the logging of wells in a petroleum producing field, it frequently is of prime importance to determine accurately the depth of the bottom of the well bore, not merely because of the value of this information per se, but also because it permits use of the well bore bottom as a reference point for locating with increased accuracy the depths of geological formations through which the bore passes. Because of the quite considerable depths of some wells, which may be of the order of thousands of feet, ordinary methods of depth measurement suited to shallow earth openings, may not be successfully employed. In the past the depth of well bores have been determined with acceptable accuracy by measuring the length of drill stem used in drilling the well as the same was withdrawn from the bore. It is obvious that this method of determining well bore depths may be practiced only by obtaining a careful record of the drill stem length at the time of drilling the well, thus with existing drilled wells another method of depth measurement must be employed. Furthermore, the theoretical accuracy of this method is rarely attained under actual field conditions because of the likelihood of mistakes in counting the lengths of drill stem used.

Another method for determining well bore depth is based upon plumbing the bore with a line of measured length. This method, however, because of the extreme depths encountered, requires solution of special problems, mostly of a mechanical nature, by reliance upon special procedures. For instance, it is not possible, as it is in the plumbing of shallow openings, to rely upon slackening of the plumb line as an indication that the end of the line has reached the bottom of a well bore, because the weight of several thousand feet of line which would be required for wells of ordinary depth, is such that no readily detectable slackening would occur. For this reason, some type of prospecting instrument is used in connection with the plumbing line to indicate when the bottom of the well bore is reached by transmission of signals to recording equipment located at the surface.

The present invention relates to an improved geophysical prospecting instrument for this purpose which, in addition to providing a signal indicative of the location of the well bore bottom, also permits simultaneous determination of the geophysical nature of formations traversed by the well bore. By this method, a single series of operations provides data which, in accordance with prior practices, would have required two loggings of each well: one for the depth determination and one to determine the character of traversed strata. The saving of time thus effected is an economy of especial importance in petroleum well drilling operations.

In accordance with the present invention a plumbing line of known length is provided with a geophysical prospecting instrument of the radiation-sensitive type to which is attached by a flexible linkage a radiation source in a manner such that when the assembly is suspended within a well bore the source is spaced from the prospecting instrument a distance exceeding the effective range of the radiation and thus is too distant from the instrument to exert any substantial effect thereon. As the assembly is lowered within the well bore, indications from the prospecting instrument are transmitted to surface recording equipment to provide a log indicative of the character of geological formations traversed by the bore. When the bottom of the bore is reached the radiation source rests thereon while the prospecting instrument continues its downward motion, thereby approaching the source and causing an indication in the log of the prospecting instrument of the presence in its vicinity of the radiation source. The depth of the well bore is disclosed upon the log by a maximum corresponding to the well depth indicated by the corresponding norm line which is used to indicate the position of the instrument in the bore. Thus, upon a single record, the characteristics of traversed strata and an indication of the well bore depth are recorded in correlation. It is to be understood that the position of the instrument during its movement within the bore is determined by measurement of the amount of line lowered into the bore, which usually is achieved by using a suitable measuring wheel over which the cable is passed as it enters the bore.

To facilitate a better understanding of the present invention, a specific embodiment thereof, illustrated in the accompanying drawing, will hereinafter be described, it being understood that the illustrated embodiment is provided by way of example of how the invention may be practiced and is not to be construed as a limitation upon the scope of the subjoined claims.

Referring to the drawing:

Figure 1 is essentially a diagrammatic illustration of a well bore with prospecting equipment according to the present invention positioned therein.

Figure 2 is essentially a diagrammatic illustration of the prospecting device mechanism, and, Figure 3 is a typical well log trace obtained during practice of the present invention.

In Figure 1 of the drawing a well bore 10 is illustrated within which are positioned a geophysical prospecting instrument 11, which is of the radiation-sensitive type, and a radiation source 12, both suspended upon a cable 13. The cable, as it enters the well bore, passes over a measuring wheel 14 located at the mouth of the bore and is received upon a suitable winch 15. Electrical connections from the cable are provided to suitable recording or indicating mechanism 16, whereby measurements of the intensity of subterranean radiation obtained from the prospecting instrument 11 are correlated with measurements of the location of the instrument within the bore derived from the measuring wheel 14. Although mere visual indication of the measurements is sufficient in some instances, in usual practice the correlated measurements are recorded as a trace upon a moving permanent record sheet.

The prospecting instrument 11, details of which are illustrated in Figure 2 of the drawing, includes a casing 17 within which is mounted an ionization chamber comprising a pair of electrodes 18 and 19 within a gaseous dielectric, preferably an inert gas such as nitrogen or argon under superatmospheric pressure. A potential source 20 is connected across the electrodes 18 and 19 through a resistor 21 in a manner such that a current flows continuously between the electrodes, the magnitude of the current flow being proportional to radiation passing into the gaseous medium. The current flow is transmitted to an amplifier 22 from which the amplified signal passes to the suspending cable 13 and thence to the surface recording or indicating equipment above mentioned.

The radiation source 12 above mentioned is suspended beneath the prospecting instrument 11 by a flexible linkage 23 of a character such that when the source rests upon the bottom of the well bore as the assembly is lowered therein the prospecting instrument 11 will be freely permitted to approach the radiation source 12. A chain or flexible cable is suitable for this purpose.

The radiation source can comprise a mass of material capable of emitting radiation of a character to which the prospecting instrument is sensitive. Naturally or artificially radioactive substances which emit readily detectable radiation are suitable for this purpose. The mass of material used is of sufficient size to provide radiation of an intensity not readily confused with the natural radiation emanating from nearby geological formations. Sources of subatomic particle streams such as neutrons can also be used, a conveniently available substance for this purpose being a mixture of radon and boron or beryllium, and in this instance the radiation detector ionization chamber is provided with a lithium or silver coating to facilitate neutron stream detection. Other suitable radiation sources will be apparent to those versed in this art, together with the modifications of the detecting equipment incident to use with the particular source.

In Figure 3 a typical well log obtained by practicing this invention is illustrated. It will be noticed that the log includes a portion between the points A and B, wherein deviations of the trace 24 from the norm line 25 are indicative of the changing character of geological formations through which the well bore passes. The portion of the trace lying between the points B and C, however, is of a wholly different order of magnitude in its deviation from the norm line, thus indicating the presence in the vicinity of the prospecting instrument of an intense source of radiation corresponding to approach of the prospecting instrument to the radiation source resting upon the bottom of the well bore. The well bore depth is indicated by the point C upon the norm line corresponding to the maximum of the trace. Thus, from the single record, is derived an indication both of the character of geological strata encountered by the well bore and also an indication of its depth.

Modifications of the method of geophysical prospecting according to this invention hereinabove described will suggest themselves to those versed in this art. For example, the prospecting instrument and radiation source can be interchanged in the relationship above described without departure from the spirit of the invention. The trace obtained in this instance would be similar to that illustrated in Figure 3. Another modification of the present invention could involve the placing of a radiation source at the bottom of the well bore prior to logging of the bore in accordance with usual radioactivity well-logging methods, with the result that the trace would indicate a maximum when the prospecting instrument used approaches the radiation source located at the bottom of the bore. The radiation source could be removed from the well bore subsequent to the logging operations by use of a fishing line or, if this is not expedient, could be left therein.

We claim:

1. Apparatus useful in geophysical prospecting within a well bore that comprises a radiation detector, means for suspending said detector within a well bore, a radiation source, and means for freely suspending said source within the well bore in spaced relationship relative to the detector, said means having sufficient flexibility that the detector can move within the bore hole into close proximity to said source.

2. Method of geophysical prospecting that comprises lowering within a well bore an assembly comprising a radiation detector and a radiation source freely suspended in spaced relationship from the detector, permitting a portion of the assembly to rest upon the well bore bottom during a portion of the lowering operation, and determining the location of the well bore bottom by noting detections from said detector.

3. Apparatus useful in geophysical prospecting within a well bore that comprises a radiation source, a detector sensitive to radiation from said source, means for freely suspending the source and the detector upon a common support within the well bore in a spaced relationship such that radiation from the source normally is not detected by the detector, said means including a connecting link between said source and said detector of sufficient flexibility that the one can move within the bore hole into close proximity to the other.

4. Method of geophysical prospecting within a well bore that comprises suspending upon a common support an assembly comprising a radiation source and a radiation detector within a well bore in a spaced relationship such that the source normally does not discharge radiation having a range sufficient to span the intervening space and be detected by the detector, lowering the assembly within the well bore until the bottom is encountered and the source and detector approach each other, and determining the depth of the well bottom by recording the location of the detector in correlation with indications of radiation therefrom characteristic of the presence of the source in the vicinity thereof.

5. Apparatus for geophysical prospecting that comprises a radiation source, a detector sensitive to said radiation, a linkage having sufficient flexibility that the source and detector can move within the bore hole into close proximity to each other for connecting said source and detector to permit the same to be suspended in spaced relationship such that the detector will be substantially unaffected by radiation from the source, and means for moving the detector and source while so connected within a well bore.

6. Method of geophysical prospecting that comprises placing within a well bore an assembly comprising a radiation source and flexibly connected thereto a detector for said radiation, lowering said assembly until it rests upon the bore bottom whereby the detector and source are positioned closer to each other than while being lowered within the bore, and determining the change in relative position of the source and detector by radiation measurement made by the detector.

7. Apparatus useful in geophysical prospecting within a well bore that comprises a gamma radiation detector, means for suspending said detector within a well bore, a gamma radiation source, and means for freely suspending said source within the well bore in spaced relationship relative to the detector, said means having sufficient flexibility that the detector can move within the bore hole into close proximity to said source.

8. Method of geophysical prospecting that comprises lowering within a well bore an assembly comprising a gamma radiation detector and a gamma radiation source freely suspended in spaced relationship from the detector, permitting a portion of the assembly to rest upon the well bore bottom during a portion of the lowering operation, and determining the location of the well bore bottom by noting detections from said detector.

9. Apparatus useful in geophysical prospecting within a well bore that comprises a gamma radiation source, a detector sensitive to gamma radiation, means for freely suspending the source and the detector upon a common support within the well bore in a spaced relationship such that gamma radiation from the source normally is not detected by the detector, said means including a connecting link between said source and said detector of sufficient flexibility that the one can move within the bore hole into close proximity to the other.

10. Method of geophysical prospecting within a well bore that comprises suspending upon a common support an assembly comprising a gamma radiation source and a gamma radiation detector within a well bore in a spaced relationship such that the source normally does not discharge radiation having a range sufficient to span the intervening space and be detected by the detector, lowering the assembly within the well bore until the bottom is encountered and the source and detector approach each other, and determining the depth of the well bottom by recording the location of the detector in correlation with indications of radiation therefrom characteristic of the presence of the source in the vicinity thereof.

11. In combination with a geophysical prospecting instrument of the radiation-sensitive type, a source of radiation, means for freely suspending said source beneath the instrument at a distance such that radiation from the source is normally without substantial effect upon the instrument, said means having sufficient flexibility that the detector can move within the bore hole into close proximity to said source.

12. In combination with a geophysical prospecting instrument of the type including a gamma ray detector, a source of gamma radiation, means for freely suspending said source of gamma radiation beneath the instrument at a distance such that gamma radiation from the source is without substantial effect upon the detector, said means having sufficient flexibility that the detector can move within the bore hole into close proximity to said source.

BRUNO PONTECORVO.
GILBERT SWIFT.